UNITED STATES PATENT OFFICE.

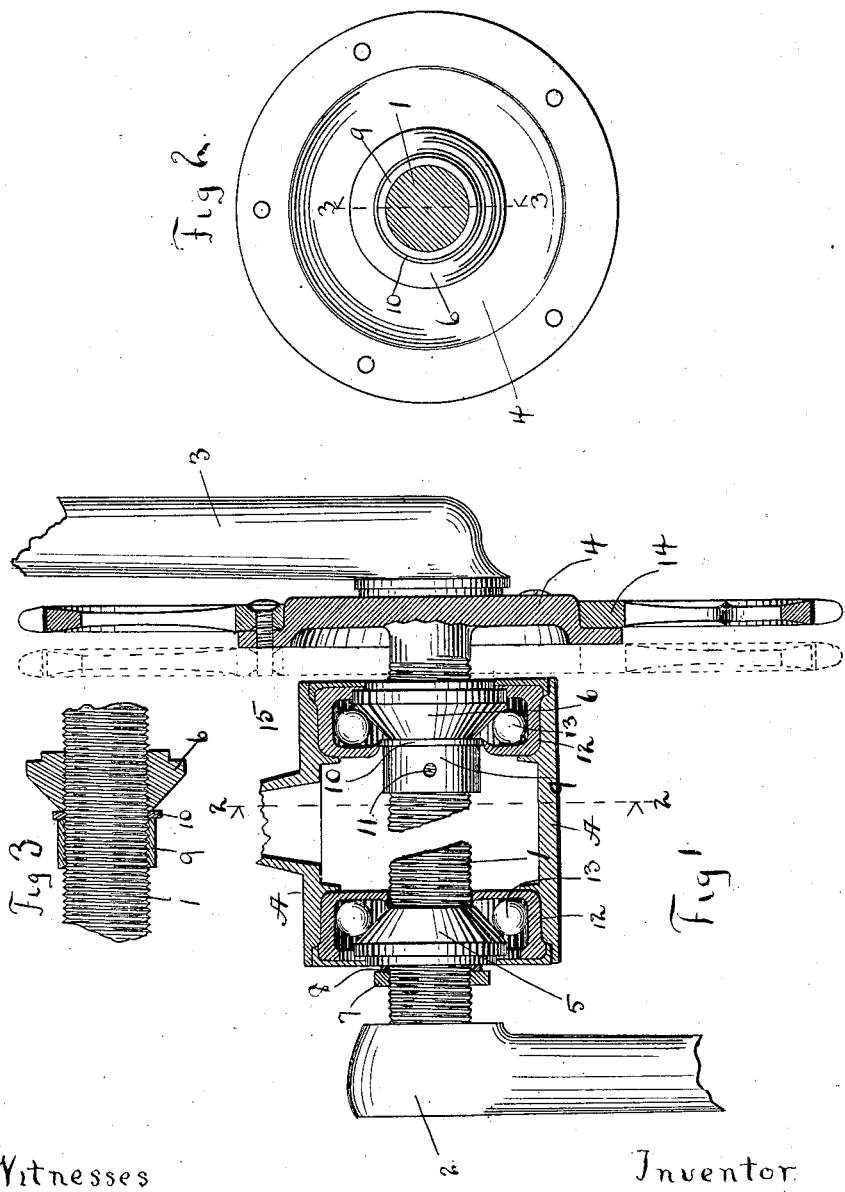

GEORGE H. MEISER, OF CHICAGO, ILLINOIS, ASSIGNOR TO EXCELSIOR SUPPLY CO., OF CHICAGO, ILLINOIS, A CORPORATION OF ILLINOIS.

BICYCLE CRANK-HANGER.

No. 903,392.  Specification of Letters Patent.  Patented Nov. 10, 1908.

Application filed May 31, 1904. Serial No. 210,480.

*To all whom it may concern:*

Be it known that I, GEORGE H. MEISER, citizen of the United States, residing at Chicago, in the county of Cook and State of Illinois, have invented a certain new and useful Improvement in Bicycle Crank-Hangers, of which the following is a full, clear, concise, and exact description, reference being had to the accompanying drawings, forming a part of this specification.

My invention relates to bicycle crank shafts and the like.

Prominent objects of the invention are, to arrange for the easy and ready bodily adjustment of the shaft with reference to the bicycle frame; to permit the shaft to be adapted to forms of different construction; to permit perfect alinement or adjustment of the sprocket wheel of the shaft with reference to the sprocket wheel on the rear or other driven wheel of the vehicle; to secure adequate space between the sprocket wheel and adjacent crank arm; and to secure the above results in a simple, practical and expeditious manner.

In the accompanying drawings, Figure 1 is a view partly in elevation and partly in vertical section, of a bicycle crank shaft and hanger embodying my invention; Fig. 2 is a section taken on line 2—2 in Fig. 1, the hanger being omitted; Fig. 3 is a detail of construction taken on line 3—3 in Fig. 2.

The crank shaft shown in the drawings for carrying out my invention, comprises the usual rotary shaft 1 provided at its ends with arms 2 and 3, and also with an integrally formed disk or plate 4 adjacent to the arm 3. The shaft 1 is threaded for substantially its entire length and is provided with adjustable cones 5 and 6 which are made adjustable by being screw-threaded so as to permit them to be shifted along the shaft 1 by turning them relatively thereto. The cone 5 is shown provided with a locking nut and a washer 7 and 8 respectively, which are between said cone and the arm 2, and the cone 6 is shown provided with a locking sleeve 9 and washer 10 which are on the inner side of said cone,—that is on the side opposite the crank 3 and disk 4. The nut 7 and sleeve 9 are screw-threaded so as to permit their ready movement relatively to the shaft 1, whereby by turning them, the cones 5 and 6 respectively can be readily locked in the position to which said cones or either of them may be adjusted.

The nut 7 is adapted to be turned by a wrench and the sleeve 9 either by hand or by a pointed tool for which purpose said sleeve is provided with an aperture 11. Bearings 12, 12 are shown provided with balls 13, 13 which are shown arranged upon the cones 5 and 6. The ball races 12, 12 are loose and separate from the cones 5 and 6 and are provided with rigidly attached caps 16, 16 constructed with flanges 17, 17, which tightly embrace the outer edges of the ball races 12, 12, thus forming retainers for the balls 13, 13. The ball races 12, 12 fit loosely in sockets formed in the usual crank hanger A of the bicycle. Thus either cone with its ball race can be adjusted as desired.

The sprocket wheel 14 is shown secured by screws 15 to the disk 4. The sprocket wheel 14 is made with its opposite side faces substantially alike,—that is flat, in the arrangement shown,—and the disk 4 is shown with two opposite coöperating faces or surfaces whereby the sprocket wheel 14 can be secured on either side of the disk 4, it being shown in dotted lines in Fig. 1 on one side, and in full lines in said figure on the other side.

From the foregoing it will be seen that by adjusting both of the cones 5 and 6 the shaft can be given a bodily adjustment relatively to the bicycle frame to secure perfect alinement between the two sprocket wheels over which the sprocket chain passes. Also that by adjusting one or the other of said cones, the shaft can be adjusted to compensate for differences in the width of bearings in the same make of bicycle and also the different width of different makes of bicycles. By such arrangement also the space between the sprocket wheel and the adjoining crank, can be increased to prevent cramping and other undesirable effects, by placing the sprocket wheel on the inside of the crank disk where this is permitted by the frame.

It will be understood that the cones or bearings can be made adjustable relatively to the crank shaft in other ways, and also that other changes and modifications can be made without departing from the spirit of my invention.

What I claim is:—

1. The combination with a crank shaft of a pair of bearings, each of said bearings comprising a cone mounted for longitudinal adjustment along the shaft and a ball race and balls, the ball race being substantially locked to the cone with respect to longitudinal movement relative thereto so that the ball race is carried by and adjusted with the cone.

2. The combination with a crank shaft of a pair of bearings, each bearing comprising a cone mounted for adjustment along the shaft and a ball race and balls, the ball race being connected with the cone to limit the longitudinal movement of the race relative to the cone so that the ball race is carried by and adjusted with the cone.

3. The combination with a crank shaft and a hanger of a pair of bearings, each of said bearings comprising a cone mounted for longitudinal adjustment along the shaft and a ball race and balls, the ball race being substantially locked to the cone with respect to longitudinal movement relative thereto so that the ball race is carried by and adjusted with the cone, the ball races of the bearings having a loose fitting engagement with a crank hanger.

4. The combination with a crank shaft of a pair of bearings, each of said bearings comprising a cone mounted for longitudinal adjustment along the shaft and a ball race and balls, the ball race being substantially locked to the cone with respect to longitudinal movement relative thereto so that the ball race is carried by and adjusted with the cone and means adjustable along the shaft to lock the cones to the shaft.

5. The combination with a crank hanger and a crank shaft threaded at both ends, of a pair of bearings each bearing comprising a threaded cone to adjustably engage the shaft and a ball race and balls, the ball race being substantially locked to the cone with respect to longitudinal movement relative thereto, so that the ball race is carried by and adjusted with the cone, the ball races of the bearings being adapted to have a loose fitting engagement with the crank hanger and a lock nut for each cone.

6. The combination with a crank shaft of a pair of bearings, each bearing comprising a cone mounted for adjustment along the shaft and a ball race, balls and a cap, the cap being secured to the race to partially close the open side thereof and to engage one face of the cone to substantially lock the cone and race together with respect to longitudinal movement so that the ball race is carried by and adjusted with the cone.

In witness whereof, I hereunto subscribe my name this 24th day of March A. D., 1904.

GEORGE H. MEISER.

Witnesses:
 I. C. LEE,
 G. V. DOMARUS.